United States Patent
Sim et al.

(10) Patent No.: US 9,586,536 B1
(45) Date of Patent: Mar. 7, 2017

(54) STRENGTH-REINFORCING METAL SHEET

(71) Applicants: HYUNDAI MOTOR COMPANY, Seoul (KR); SAEHAN INDUSTRIAL CO., LTD., Siheung-si, Gyeonggi-do (KR)

(72) Inventors: Jae Gi Sim, Seoul (KR); Sung Jin Park, Uiwang-si (KR)

(73) Assignees: HYUNDAI MOTOR COMPANY, Seoul (KR); SAEHAN INDUSTRIAL CO., LTD., Siheung-si (KR)

( * ) Notice: Subject to any disclaimer, the term of this patent is extended or adjusted under 35 U.S.C. 154(b) by 0 days.

(21) Appl. No.: 14/956,562

(22) Filed: Dec. 2, 2015

(30) Foreign Application Priority Data

Sep. 2, 2015 (KR) .................. 10-2015-0124016

(51) Int. Cl.
*B60R 13/08* (2006.01)

(52) U.S. Cl.
CPC ...... *B60R 13/0815* (2013.01); *B60R 13/0876* (2013.01); *Y10T 428/12417* (2015.01)

(58) Field of Classification Search
CPC ............ B21D 13/04; Y10T 428/12417; B60R 13/015; B60R 13/0876
See application file for complete search history.

(56) References Cited

U.S. PATENT DOCUMENTS

| | | | | |
|---|---|---|---|---|
| 107,752 A | * | 9/1870 | Barker et al. .......... | B21D 13/02 428/604 |
| 1,006,601 A | * | 10/1911 | Speller .................. | B21D 13/04 428/604 |
| 3,011,602 A | * | 12/1961 | Ensrud ..................... | E04C 2/32 244/123.12 |
| 3,151,712 A | * | 10/1964 | Jackson ............... | B62D 33/048 219/78.11 |
| 4,318,965 A | * | 3/1982 | Blair ..................... | B23K 1/008 219/78.02 |
| 6,176,819 B1 | * | 1/2001 | Boegli ..................... | B31F 1/07 493/194 |
| 6,200,664 B1 | * | 3/2001 | Figge ....................... | B32B 3/18 102/303 |
| 2012/0192610 A1 | | 8/2012 | Hiraoka et al. | |

FOREIGN PATENT DOCUMENTS

| | | |
|---|---|---|
| JP | 2005-76766 | 3/2005 |
| JP | 2010-179320 A | 8/2010 |
| JP | 2013-071130 A | 4/2013 |
| JP | 2013-230593 | 11/2013 |
| KR | 10-0476118 | 3/2005 |
| KR | 10-1405218 B1 | 6/2014 |
| KR | 10-1461919 B1 | 11/2014 |
| WO | 98/09745 | 3/1998 |

* cited by examiner

*Primary Examiner* — Adam Krupicka
(74) *Attorney, Agent, or Firm* — Brinks Gilson & Lione

(57) ABSTRACT

A strength-reinforcing metal sheet having repetitive concave and convex features is provided. Concave beads extend in repetitive quadrangular lattice features. A plurality of convex cells are defined between the beads, protrude above the beads, and have repetitive convex features. The upper portion of each of the cells has a pyramidal shape similar to a dome. The uppermost point thereof is formed at an eccentric point offset from the central point of the cell.

7 Claims, 3 Drawing Sheets

STRENGTH-REINFORCING METAL SHEET

CROSS-REFERENCE TO RELATED APPLICATION

The present application claims the benefit of and priority to Korean Patent Application No. 10-2015-0124016, filed on Sep. 2, 2015, which is incorporated herein by reference in its entirety.

FIELD

The present disclosure generally relates to a strength-reinforcing metal sheet.

BACKGROUND

The statements in this section merely provide background information related to the present disclosure and may not constitute prior art.

Recently, the automotive industry has been devoting much energy to research and development in order to increase fuel efficiency by reducing the weight of vehicles using downsized engines having increased power.

Along with increasing efficiency of engines, the exhaust manifold, the exhaust pipe, the catalyst, and the like of an engine are maintained at a higher temperature than in the past.

Accordingly, high performance is desired for heat protectors functioning as components to block heat (i.e. heat shields or heat insulators).

Such a heat protector according to the related art is assembled to the upper portion of an exhaust manifold by means of a bracket, and serves to block and dissipate heat radiated through the exhaust manifold from exhaust gas.

Most heat protectors are conveniently fabricated from a steel sheet coated with aluminum (Al). Recently, the use of Al thin films in vehicles has increased because such films are advantageous in terms of lightness and functionality.

Al thin films have characteristic advantages of high thermal conductivity and superior heat dissipation. However, Al thin films are not easily applicable to a complicated manifold shape. Al thin films are disadvantageously subjected to tearing, cracking, and the like while being formed. In addition, Al thin films are ineffective in reducing noise.

In order to reduce such disadvantages, recently, heat protectors have been fabricated by laminating two or more Al thin films, such that the endurance thereof is improved. In addition, a variety of shapes, such as embossments, concave-convex features, waved shapes, and the like, have been added in order to increase the ability of resultant heat protectors to dissipate heat to the air.

Nevertheless, despite such attempts, when heat protectors are formed from such Al thin films by pressing, the operation of shaping the Al thin films still has problems. For example, two or more films may be separated from each other, and heat protectors fabricated in this manner are still vulnerable to vibrations and noise.

That is, the related-art sheet having a simple wave-shaped pattern has a limited ability to provide both a heat-insulating characteristic and a heat-dissipating characteristic. The related-art sheet cannot increase both a heat-blocking characteristic in the initial stage of the operation of the engine and a heat-dissipating characteristic in a high-temperature area.

SUMMARY

The present disclosure provides a strength-reinforcing metal sheet able to improve both strength and formability due to patterned shapes formed thereon.

According to one aspect of the present disclosure, a strength-reinforcing metal sheet having repetitive concave and convex features includes: concave beads extending in repetitive quadrangular lattice features; and a plurality of convex cells defined between the beads, the cells protruding above the beads, and having repetitive convex features.

The upper portion of each of the cells has a pyramidal shape similar to a dome, with the uppermost point thereof being formed at an eccentric point offset from the central point of the cell.

The uppermost point of each of the cells may be formed on one of imaginary diagonal lines of the cell to be eccentric from the central point of the cell.

The uppermost point of each of the cells may be formed at an eccentric point offset from the central point of the cell, by 15% to 20% of a distance from the central point to the circumferential area.

The height of the uppermost point of each of the cells may range from 30% to 45% of the length of a corresponding bead among the beads corresponding to one side of the cell.

The metal sheet may be an aluminum sheet.

The thickness of the metal sheet may be 0.3 mm or less, and the metal sheet may be applied to a heat protector for a vehicle.

According to one form of the present disclosure, it is possible to improve strength by forming a single metal sheet with a pattern composed of three-dimensional pyramidal shapes (cells), the uppermost points of which are eccentric.

In addition, when a complicated profile is shaped using the metal sheet, the three-dimensional cells compensate for the portions of the metal sheet that extend during the shaping of the metal sheet, thereby improving formability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
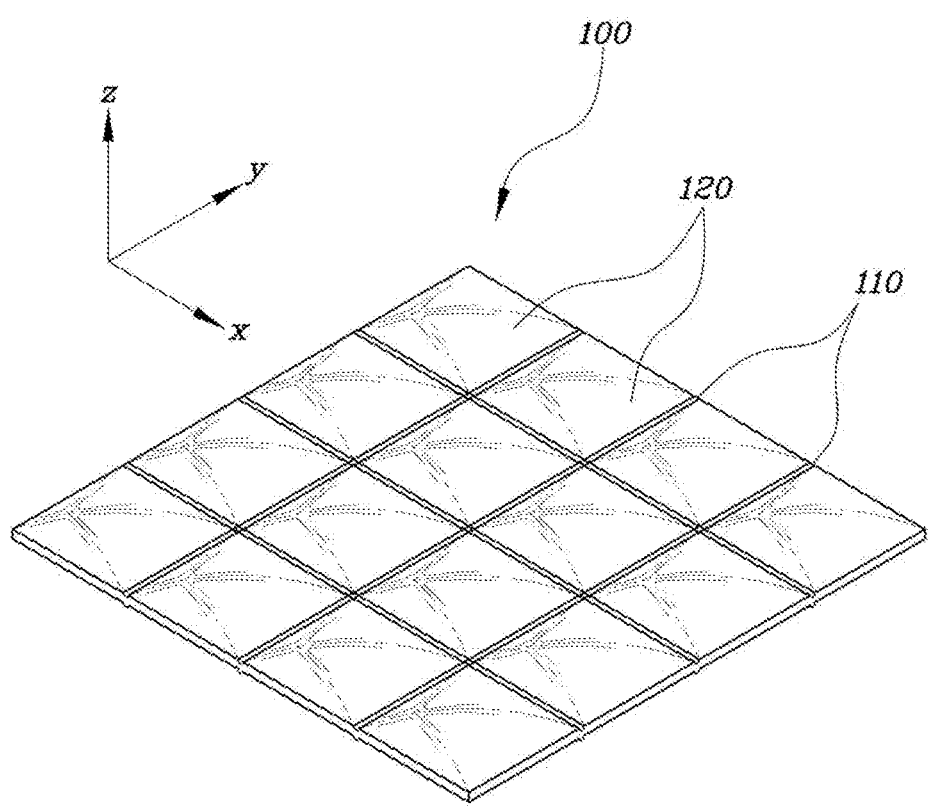
FIG. 1 is a perspective view illustrating a metal sheet according to an embodiment of the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
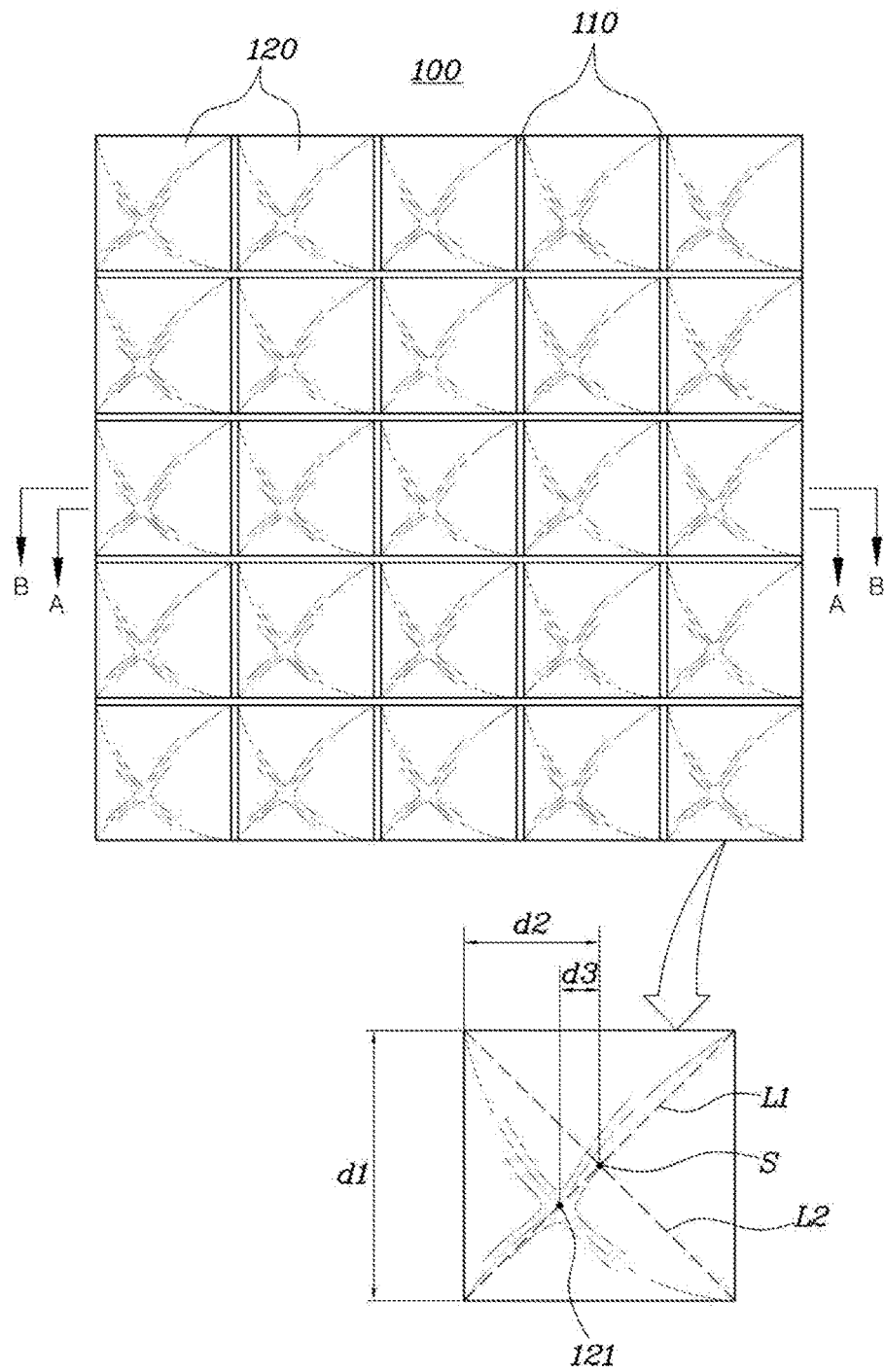
FIG. 2 is a top-plan view illustrating the metal sheet according to the embodiment of the present invention.
Figure 3:
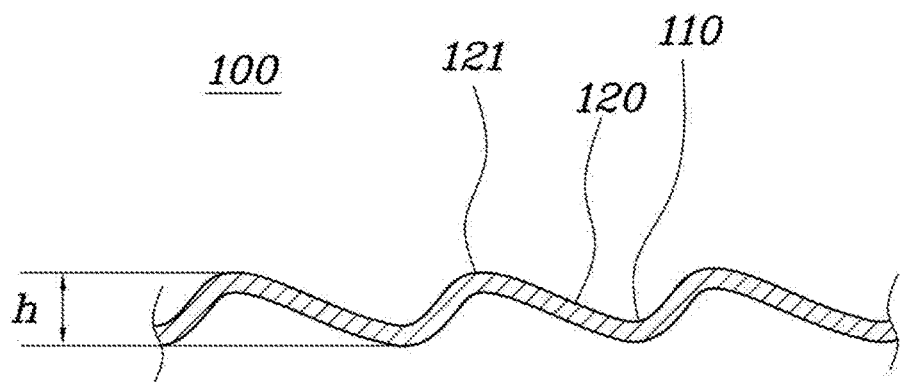
FIG. 3 is a cross-sectional view taken along line A-A in FIG. 2.
Figure 4:
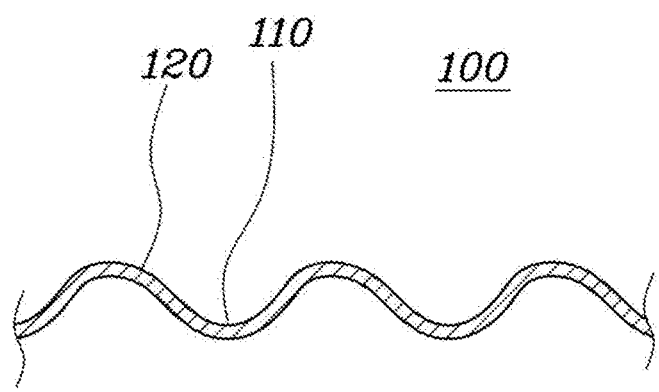
FIG. 4 is a cross-sectional view taken along line B-B in FIG. 2.

FIG. 1 is a perspective view illustrating a strength-reinforcing metal sheet according to one form of the present disclosure, FIG. 2 is a top-plan view illustrating the metal sheet according to the present form, FIG. 3 is a cross-sectional view taken along line A-A in FIG. 2, and FIG. 4 is a cross-sectional view taken along line B-B in FIG. 2.

As illustrated in FIGS. 1 to 4, the strength-reinforcing metal sheet 100 according to the present form is a single sheet material formed of aluminum (Al). The strength-reinforcing metal sheet 100 is applicable to the fabrication of insulating components for vehicles, and is applied to a thin sheet for the purpose of lightness. For example, strength-reinforcing metal sheet 100 according to the present form can be applied to the fabrication of a heat protector for a vehicle, and can be applied to a sheet having a thickness of 0.3 mm or less.

The metal sheet according to the present form has concave and convex features repeatedly formed thereon.

The metal sheet 100 includes concave beads 110 extending in repetitive quadrangular lattice features and a plurality of convex cells 120 defined between the beads 110. The plurality of cells 120 protrude above the beads 110, and have repetitive convex features.

The beads 110 are spaced apart from each other at equal distances in the longitudinal and lateral directions, thereby forming quadrangular areas therein. In one form, the distances between the beads 110 are maintained at about 6 mm considering the thickness of the metal sheet 100. Thus, the plurality of cells 120 protrude upwards between the beads 110, thereby forming three-dimensional shapes. In this form, the length of the portions of the cells 120 corresponding to the sides is maintained to be about 6 mm.

The upper end portion of each of the cells 120 has a substantial pyramidal shape similar to a dome. Here, the portion corresponding to the uppermost point 121 of each pyramid is formed in an eccentric point offset from the central point S of the cell 120.

For example, the uppermost point 121 of the cell 120 is formed on one of imaginary diagonal lines L1 and L2 of the cell 120 to be eccentric from the central point S of the cell 120. The direction in which the uppermost point 121 is eccentric from the central point S may selectively vary depending on the direction in which the metal sheet 100 is shaped when components of vehicles are fabricated from the metal sheet 100.

In one form, the uppermost point 121 of the cell 120 is formed at an eccentric point that is offset from the central point S of the cell 120, by 15% to 20% of the distance d2 from the central point S to the circumference. This is because the torsional strength and formability of the metal sheet can be maintained at intended levels when the eccentricity of the uppermost point 121 of the cell 120 is limited to the above-described position and range. For example, the metal sheet according to the present form satisfies the torsional strength and formability in a specific direction such that the metal sheet can be applied to a component of a vehicle, such as a heat protector.

In addition, in one form, the height h of the uppermost point 121 of the cell 120 ranges from 30% to 45% of the length d1 of the bead 110 corresponding to one side of the cell 120. This is because the amount of the material introduced (used) is determined by the height h of the uppermost point 121 of the cell 120 and in one form the height h of the uppermost point 121 of the cell 120 is generally within the above-proposed range considering the amount of the material introduced compared to the strength of the material. Beyond the above-described range, the amount of the material introduced may be extra although the effect of improving strength is relatively insignificant. Thus, the cost is considered to be higher. Below the above-described range, an intended level of strength may not be obtained.

As illustrated in FIGS. 3 and 4, the cross-sectional shape of the cell 120 varies depending on the position in which the cross-section is taken.

FIG. 3 is a cross-sectional view taken along line A-A in FIG. 2. The line A-A is an imaginary line crossing the uppermost point 121 of the cell 120. The incline of the left area of the cell 120 with respect to the uppermost point 121 of the cell 120 is greater than the incline of the right area of the cell 120.

FIG. 4 is a cross-sectional view taken along line B-B in FIG. 2. The line B-B is an imaginary line crossing the central point S of the cell 120. The inclines of the left area and the right area of the upper area of the cell 120 illustrated in FIG. 4 are smaller than the inclines of the left area and the right area of the cell 120 illustrated in FIG. 3. In addition, the upper area illustrated in FIG. 4 is formed flatter than the area of the uppermost point 121 of the cell 120 illustrated in FIG. 3.

The physical properties of the metal sheet formed as above are compared with those of the related art.

The cells 120 formed on the metal sheet 100 according to the present form have a different shape from cells of the related art having hemispherical embossments or cells of the related art formed using embossments.

In the metal sheet having hemispherical embossments of the related art, the height of partitions is limited since the partitions are formed by shaping protrusions, and the deformability (the limit of plastic deformation) thereof is limited. In contrast, the height and the shape of the cells 120 having the pyramidal shape according to the present form can be realized independently, whereby the physical properties, such as strength and formability, of the metal sheet can be more effectively adjusted.

In addition, the pyramid-shaped cells 120 according to the present form have intersecting areas, in which strength-reinforcing cell intersections are formed, i.e. the beads 110 are formed in the shape of crosses. This configuration increases the torsional strength of the metal sheet to be greater than that of a sheet having no pattern. Consequently, the metal sheet according to the present form can maintain its shape as a specific component for a vehicle at a smaller thickness of 0.3 t.

Furthermore, according to the present form, it is possible to form a complicated component for a vehicle from a thin sheet by pressing.

In addition, it is possible to easily fabricate a multilayer composite sheet using the metal sheet 100 formed of a single layer sheet according to the present form. A heat-blocking component having a three-layer structure can be provided by disposing a heat insulating material between the metal sheets according to the present form.

Although each of the cells 120 has the pyramidal shape according to the present form, wave-shaped features are formed on the entire area of metal sheet 100, thereby advantageously increasing strength as well as formability through the introduction of a material when a complicated profile is shaped.

For example, when excessive shaping conditions are required for the portions perpendicular to the wave-shaped portions (when plastic deformation exceeding the elongation of the material is required), the groove portions of the cells 120 formed due to the wave-shaped features according to the present form are unfolded, thereby compensating for the portions extended during the shaping of the material. Consequently, a significantly greater amount of material is introduced in a specific area than the existing sheet having embossments, thereby significantly improving formability.

In the meantime, according to the present form, the cells 120 having eccentric uppermost points 121 reinforce strength more than hemispherical protrusions of the related art.

Torsional strength can be considered as a comparative case, and the following results were obtained through relative comparison.

When the strength of a metal sheet having no pattern is assumed to be 1, the strength a metal sheet having embossments (hemispherical protrusions) was improved to about 1.3. In contrast, the strength of the metal sheet according to the present embodiment was improved to 1.5 to 1.8.

Although the exemplary embodiments of the present invention have been described for illustrative purposes, a person skilled in the art will appreciate that various modifications, additions and substitutions are possible, without departing from the scope and spirit of the present disclosure as disclosed in the accompanying claims.

What is claimed is:

1. A strength-reinforcing metal sheet having repetitive concave and convex features comprising:
   concave beads extending in repetitive quadrangular lattice features; and
   a plurality of convex cells defined between the beads, the cells protruding above the beads, and having repetitive convex features,
   wherein an upper portion of each of the cells has a pyramidal shape, with an uppermost point thereof being formed at an eccentric point offset from a central point of the cell.

2. The metal sheet according to claim 1, wherein the uppermost point of each of the cells is formed on one of imaginary diagonal lines of the cell to be eccentric from the central point of the cell.

3. The metal sheet according to claim 1, wherein the uppermost point of each of the cells is formed at an eccentric point offset from the central point of the cell, by 15% to 20% of a distance from the central point to a circumferential area.

4. The metal sheet according to claim 1, wherein a height of the uppermost point of each of the cells ranges from 30% to 45% of a length of a corresponding bead among the beads corresponding to one side of the cell.

5. The metal sheet according to claim 1, wherein the metal sheet is an aluminum material.

6. The metal sheet according to claim 5, wherein the metal sheet has a thickness of 0.3 mm or less.

7. A heat protector for a vehicle having a metal sheet according to claim 6.

* * * * *